United States Patent
Jepson et al.

(10) Patent No.: US 10,728,738 B2
(45) Date of Patent: Jul. 28, 2020

(54) SMART DEVICE FOR NOTIFICATION LOOPBACK ROUTING TO A PRIMARY COMMUNICATION DEVICE

(71) Applicant: Intel Corporation, Santa Clara, CA (US)

(72) Inventors: Daniel Jepson, San Jose, CA (US); Charles Carter Jernigan, Santa Clara, CA (US); Nicholas Moe Khosravy, Palo Alto, CA (US); John Wei, Saratoga, CA (US); Fai Yeung, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/089,398

(22) Filed: Apr. 1, 2016

(65) Prior Publication Data
US 2017/0289789 A1     Oct. 5, 2017

(51) Int. Cl.
*H04W 8/18*      (2009.01)
*H04W 76/10*    (2018.01)
*H04W 4/80*      (2018.01)
*H04W 88/04*    (2009.01)

(52) U.S. Cl.
CPC ............... *H04W 8/18* (2013.01); *H04W 4/80* (2018.02); *H04W 76/10* (2018.02); *H04W 88/04* (2013.01)

(58) Field of Classification Search
CPC ..... H04W 4/001; H04W 24/10; H04W 60/06; H04W 8/18; H04W 12/06; H04W 76/02; H04W 8/265; H04W 24/04; H04W 28/06; H04W 4/00; H04W 4/005; H04W 4/12; H04W 4/206; H04W 76/06
USPC ......................................................... 455/41.2
See application file for complete search history.

(56) References Cited

U.S. PATENT DOCUMENTS

| | | | | |
|---|---|---|---|---|
| 2003/0142342 | A1* | 7/2003 | Simpson ............... | G06F 3/1207 358/1.15 |
| 2007/0285390 | A1* | 12/2007 | Yee ......................... | H04L 51/14 345/163 |
| 2012/0214480 | A1* | 8/2012 | Ionescu ............... | H04L 65/1073 455/425 |
| 2013/0335772 | A1* | 12/2013 | Waller ............... | H04N 1/00244 358/1.15 |
| 2014/0370864 | A1* | 12/2014 | Lin ........................ | H04M 3/20 455/415 |
| 2016/0371645 | A1* | 12/2016 | Serjeantson ....... | G06Q 10/0833 |
| 2017/0199501 | A1* | 7/2017 | Kwan ............... | H04W 52/0251 |

\* cited by examiner

*Primary Examiner* — Ajibola A Akinyemi
(74) *Attorney, Agent, or Firm* — Patent Capital Group

(57) ABSTRACT

One embodiment relates to an apparatus, comprising logic, at least partially incorporated into hardware, to receive a notification message from a primary communication device by a smart device using a first communication protocol, the notification message including notification information received at an operating system layer of the primary communication device; determine, by the smart device, whether the notification message meets predetermined criteria; and responsive to a determination that the notification message meets the predetermined criteria, send, by the smart device, a loopback notification message including a representation of at least a portion of the notification information to the primary communication device using a second communication protocol.

24 Claims, 5 Drawing Sheets

SMART DEVICE FOR NOTIFICATION LOOPBACK ROUTING TO A PRIMARY COMMUNICATION DEVICE

TECHNICAL FIELD

This application relates to the field of computing, and more particularly to a smart device for notification loopback routing to a primary communication device.

BACKGROUND

In some current smartphone implementations, the notification protocol used by the smartphone to communicate with smart devices connected to the smartphone is prevented by the operating system from forwarding user notifications, such as text messages, email, etc., directly to applications residing on the smartphone. For example, currently the Apple Notification Center Service (ANCS) allows Bluetooth accessories connected to an iOS smartphone through a Bluetooth low-energy (BLE) link access to some notifications generated on the iOS smartphone. However, ANCS does not allow the iOS operating system to forward user data sent to the iOS layer to go directly to applications for consumption. While this creates greater trust that applications are not allowed to take advantage of a smartphone user's data, such outright prohibition disables a variety of scenarios in which it might actually be useful and desired by the user to have one or more applications have visibility into such data.

BRIEF DESCRIPTION OF THE DRAWINGS

Embodiments are illustrated by way of example and not limitation in the figures of the accompanying drawings, in which like references indicate similar elements and in which.

DETAILED DESCRIPTION OF EXAMPLE EMBODIMENTS

Figure 1:
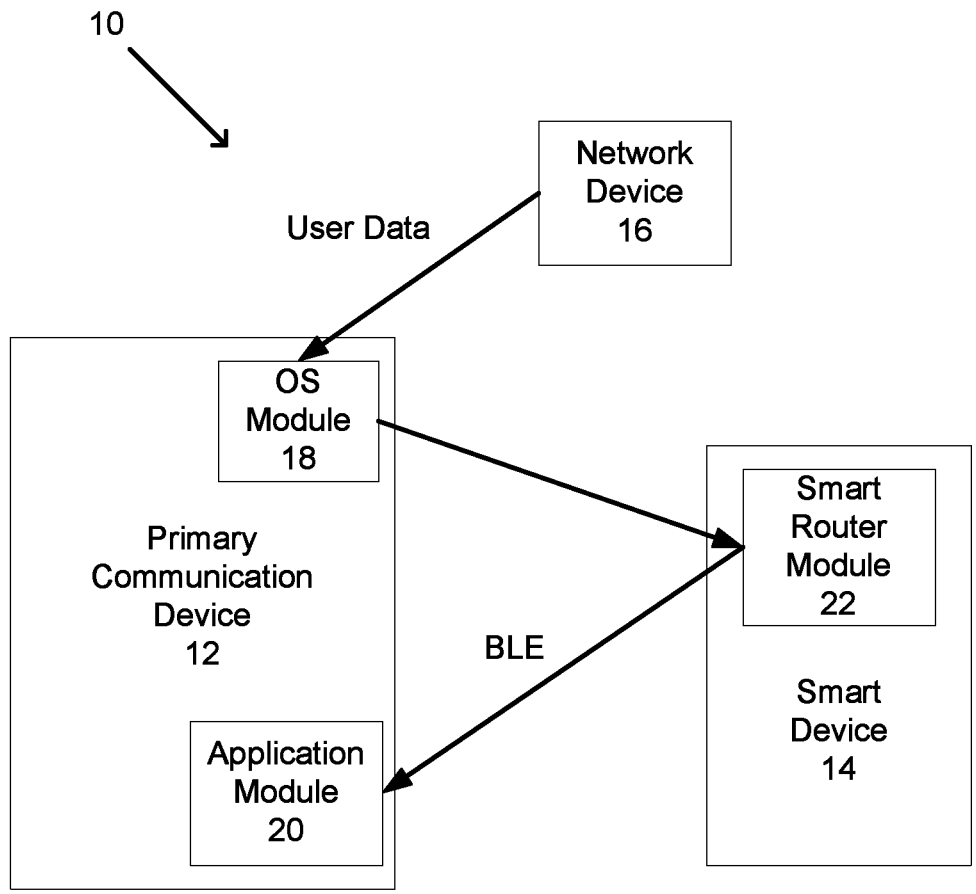
FIG. 1 illustrates an embodiment of a communication system for notification loopback routing to a primary communication device.

One or more example embodiments are directed to a smart device configured with smart router functionality residing on a smart device that enables the smart device to receive messages representing user data from a primary communication device wirelessly connected to the smart device, filter the messages to determine if the user data meets certain criteria, and returning the user data meeting the criteria to the primary communication device so that one or more applications residing on the primary communication device can process the data. In particular embodiments, the user data may include one or more of an email, a local notification, a push notification, a calendar alert, a reminder, an incoming call, a text message, or any other user data. In particular embodiments, the smart device receives a notification message representing the user data from the primary communication device and returns the user data to an applicable application of the primary device via a BLE protocol.

In one or more embodiments, while an application on a smartphone may not be able to forward user data, such as emails, text messages, etc. directly to an application from the operating system layer, a notification or message representing the email, text message, etc. can be sent to a smart device configured with smart routing functionality. In a particular embodiment, the smart router of the smart device receives a message using ANCS from the smartphone, determines whether an application on the smartphone should receive the user data based upon criteria such as a category of the data, priority of the data, and scheduling to efficiently use ecosystem resources (battery, efficient processing times, etc.), and return the user data meeting the criteria to the smartphone for use by an application using BLE, Bluetooth Classic, or any other suitable communication protocol. Although particular embodiments are described as using ANCS to send messages from a smartphone to the smart device, in other embodiments any suitable protocol and/or interface may be used.

In particular embodiments, using ANCS, a message containing user data received from a primary communication device is forwarded to the smart device to analyze, classify, prioritize, queue and schedule sending of some or all of the user data back to the primary communication device via BLE, Bluetooth Classic, or any other suitable communication protocol. Since BLE transmissions can be expensive operations in terms of resource usage for "small" devices, the kinds of events that may be routed back to an application on the primary communication device can be limited according to predefined criteria, such as a category of the user data, user choice, priority, and resource usage efficiency. In one example, smart devices that are recognized by the primary communication device can be scanned, and ones that are recognized by the user can be designated as candidates for routing of some or all of the user's data received by the smart device. In particular embodiments, by employing ANCS from the primary communication device to the smart device and BLE from the smart device back to the primary communication devices, the limitations on ANCS may be overcome. Advanced scheduling, prioritization, classification, queuing, batching, etc. provided by the smart device enable power savings on the smart device because if all user data is always routed back, a lot of battery power may be consumed quickly.

FIG. 1 illustrates an embodiment of a communication system 10 for notification loopback routing to a primary communication device. In the particular embodiment illustrated in FIG. 1, communication system 10 includes a primary communication device 12, a smart device 14, and a network device 16. Primary communication device 12 is configured to wirelessly communicate with each of smart device 14 and network device 16. In particular embodiments, primary communication device 12 communicates with smart device 14 using a Bluetooth low energy (BLE) communication protocol such as described in the Bluetooth Core Specification Version 4.0. In particular embodiments, primary communication device 12 is a communication and/or computing device, such as a smartphone, configured to received user data from network device 16, forward a message representative of the user data to smart device 14, and receive a loopback transmission of the user data meeting predetermined criteria from smart device 14 to allow an application associated with primary communication device 12 to process the user data.

In particular embodiments, smart device 14 may include a wireless device configured with smart routing capability to receive user data from primary communication device 12, filter the user data to determine if the user data meets predetermined criteria, and transmit the user data meeting the predetermined criteria to primary communication device 12. In particular embodiments, smart device 14 may include one or more of a smart watch, a fitness and/or activity tracker, a health monitor, a navigation device, a media playback device, a smart phone, smart jewellery, smart glasses, a head-mounted optical display, a headset, an earbud or any other suitable electronic device configured to communicate data with primary communication device 12. Network device 16 is a network device configured to send user data such as an email or text message to primary communication device 12. In particular embodiments, network device 16 may include a server. Although the embodiment of FIG. 1 is illustrated using a single smart device 14 and network device 16 in communication system 10, it should be understood that in other embodiments any number of smart devices and network devices may be present.

Primary communication device 12 includes an operating system (OS) module 18 including the operating system of primary communication device 12 and an application module 20 including one or more applications. Smart device 14 includes a smart router module 22 configured to perform the notification loopback routing functions as described herein.

In an example operation of communication system 10 of FIG. 1 according to one embodiment, OS module 18 of primary communication device 12 receives user data associated with a user of primary communication device 12 from network device 16. In a particular embodiment, the user data may include an email, text message, incoming caller ID, or any other notification or user data. In a particular embodiment, network device 16 sends the user data to primary communication device 12 via a wireless connection such as a cellular connection or Wi-Fi connection. Primary communication device 12 then sends the user data to smart router module 22 of smart device 14 using a first communication protocol. In a particular embodiment, primary communication device 12 sends the user data using ANCS.

Smart router module 22 is configured to filter the user data to determine whether all or a portion of the user data meets predetermined criteria for sending back to primary communication device 12. In one or more embodiments, smart router module 22 analyzes, classifies, prioritizes, queues and schedules the sending of user data according to the predetermined criteria. In particular embodiments, the predetermined criteria may include user choice, priority, and resource usage efficiency. Smart router module 22 of smart device 14 then sends the portion of the user data meeting the predetermined criteria to the application module 20 of primary communication device 12 using a second communication protocol. In a particular embodiment, smart device 14 may be a Bluetooth low energy (BLE) protocol to send the user data to primary communication device 12. Smart router module 22 may be further configured to queue any user data that has not yet been transmitted back to primary communication device 12 to be scheduled for transmitting at a later time or discarded. Upon received the transmitted data, one or more applications of application module 20 may process the user data. For example, in a particular embodiment a messaging application of primary communication device 12 may be configured to display the user data received from smart device 14.

In other embodiments, a text to speech (TTS) capability is provided for a smart device that does not have TTS capability. For example, for a caller ID announcement a user's primary communication device (such as a smartphone) may be located in the user's pocket such that the caller ID text on the screen of primary communication device 12 is not visible to the user. However, using ANCS, the text of the caller ID associated with the incoming call can be forwarded to one of any number of smart devices paired with primary communication device 12, such as smart device 14. The text contained in the notification can then be sent back to primary communication device 12 via smart device 14, e.g., via BLE, at which point a text to speech application on primary communication device 12 can process the text received from smart device 14 and perform the enhanced functionality of generating audio playback matching the text. In still another embodiment, once the application on primary communication device 12 has received the text and has generated the audio, the audio can be played back using an audio device such as a Bluetooth headset or speaker. In accordance with one or more embodiments, the TTS capability is not limited to caller ID but may be applied to any text to speech application that leverages the power of primary communication device 12 to perform the TTS, but enables the work around of receiving data to which ANCS does not provide direct access by the application.

One limitation that is widely recognized with BLE is the limit to how much information can be pushed down using BLE due to its heavy resource costs. In accordance with one embodiment, primary communication device 12 can be configured to perform an intelligent BLE interaction with the smart router of smart device 14 to signal smart device 14 to wake up Wi-Fi capabilities of smart device 14 in order to transfer large amounts of data that are more suitable to Wi-Fi than BLE, e.g., to transfer mass media. Once the transfer is complete, smart device 14 may shut down the Wi-Fi capability to reduce power consumption. In this regard, BLE can in effect be used as a switch for enabling and/or disable Wi-Fi capabilities of smart device 14. Accordingly, when it makes more sense to use BLE communications BLE is used to send notification information. When it makes more sense to use Wi-Fi to send notification information, the Wi-Fi transceiver of smart device 14 is waken up, and then shut down when appropriate to switch back to BLE communications. In another embodiment, BLE is used to switch on Bluetooth Classic instead of Wi-Fi. Bluetooth Classic has higher throughput than BLE, yet also has higher battery consumption. Various embodiments are not limited to Bluetooth Classic and Wi-Fi, as any higher power communication mechanism could be enabled temporarily.

In an example implementation according to one embodiment, consider a smart device such as a smart watch that is configured to vibrate when an incoming phone call is received on a phone. Now suppose the user wishes for the smart device to only vibrate for a VIP caller, such as a spouse. One approach would be for an application on the phone to be aware of an incoming call, and only send a message to the smart device if the caller ID matches a known caller. Unfortunately, on iOS applications cannot receive information about incoming calls directly. In particular embodiments, the smart watch silently receives notification of all incoming calls from the phone, and sends the call information back to the application on the phone. The application on the phone then determines whether the call is from a VIP, and sends another notification back to the smart watch.

Figure 2:
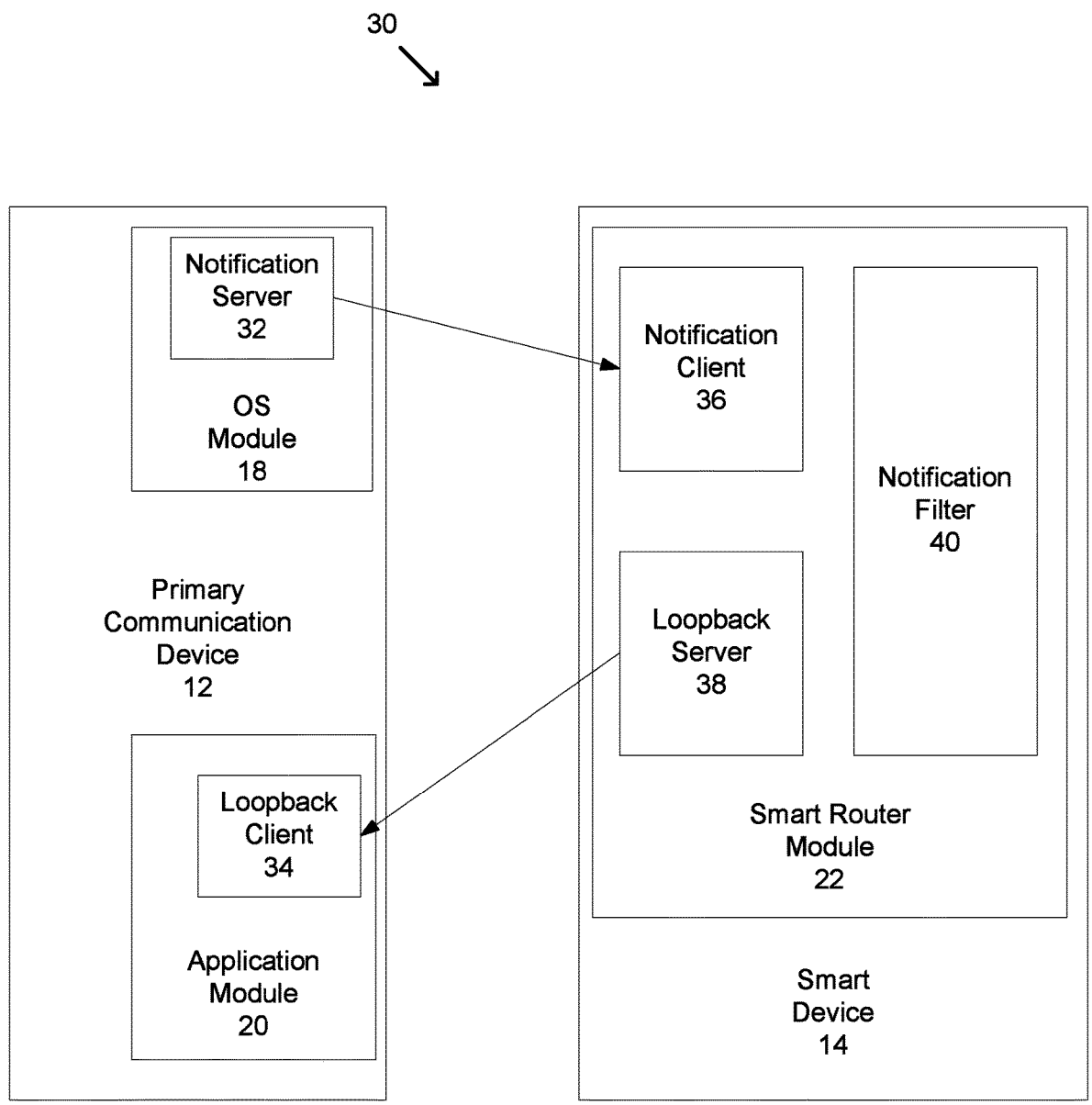
FIG. 2 illustrates a functional block diagram of the primary communication device and the smart device of the communication system according to one embodiment.

FIG. 2 illustrates a functional block diagram 30 of primary communication device 12 and smart device 14 of communication system 10 according to one embodiment. In the embodiment illustrated in FIG. 2, OS module 18 of primary communication device 12 includes a notification server 32, and application module 20 of primary communication device 12 includes a loopback client 34. Smart router module 22 of smart device 14 includes a notification client 36, a loopback server 38, and a notification filter 40. In the embodiment illustrated in FIG. 2, notification client 36 of smart device 14 sends a notification subscription request to notification server 32 of primary communication device 12 to enable notification client 36 to receive notifications from notification server 32. Further, loopback client 34 of primary communication device 12 sends a loopback subscription request to loopback server 38 of smart device 14 to enable loopback client 34 to received looped back notifications from loopback server 38.

In an example operation of the embodiment of FIG. 2, OS module 18 of primary communication device 12 receives an incoming notification. In particular embodiments, the notification is received from network device 18. In particular embodiments, the notification may include one or more of an email, a schedule notification, a news update, a missed call notification, a caller ID notification, a text message notification, or any other notification. Notification server 32 sends the notification to notification client 36 of smart device 14 using a first communication protocol. In a particular embodiment, notification server 32 sends the notification to notification client 36 using an ANCS notification. In one or more embodiments, the notification includes a notification category identifier (categoryID) indicative of a notification type of the notification. For example, the notification category identifier may identify whether the notification is an email, a text message, a schedule notification, etc. Notification client 36 then passes the notification to notification filter 40. Notification filter 40 is configured to filter received notifications according to predetermined criteria to determine whether a particular notification is to be looped back to loopback client 34 of primary communication device 12. In a particular embodiment, the predetermined criteria may include the notification category associated with the particular notification. If the particular notification is determined to meet the predetermined criteria, notification filter 40 passes the notification to loopback server 38. Loopback server 38 then transmits the notification to loopback client 34 of primary communication device 12 using a second communication protocol. In particular embodiments, the second communication protocol is a BLE protocol.

Figure 3:
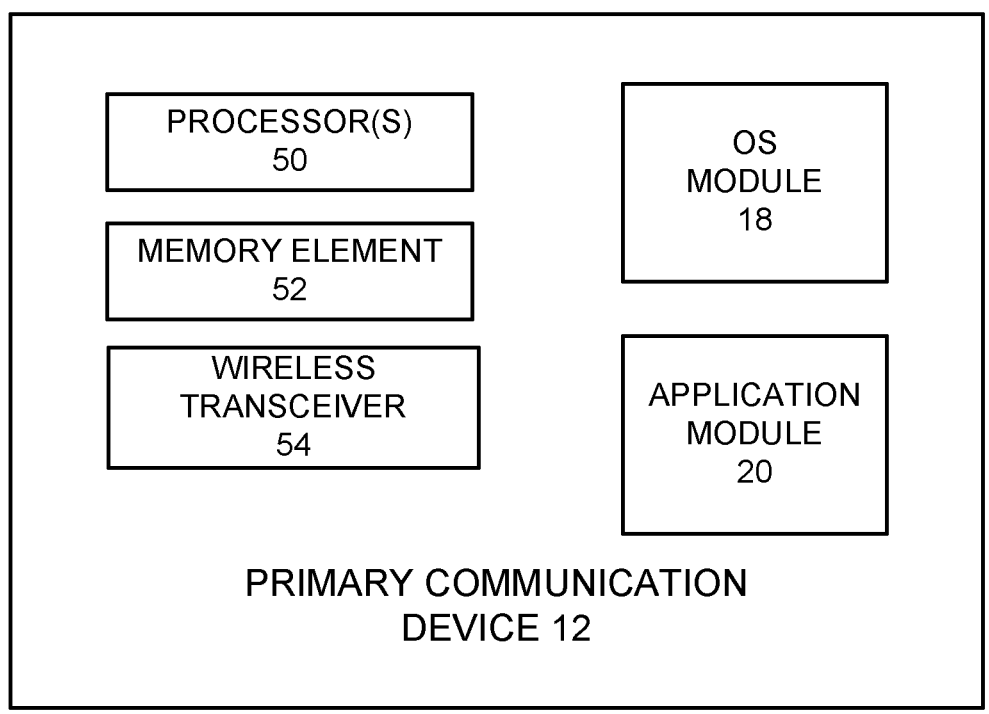
FIG. 3 illustrates an embodiment of primary communication device of the communication system of FIG. 1.

FIG. 3 illustrates an embodiment of primary communication device 12 of the communication system 10 of FIG. 1. In the particular embodiment illustrated in FIG. 3, primary communication device 12 includes one or more processor(s) 50, a memory element 52, a wireless transceiver 54, OS module 18, and application module 20. Processor(s) 50 is configured to execute software instructions to perform various operations of primary communication device 12 as described herein. Processor(s) 50 may be any type of processor, such as a micro-processor, an embedded processor, a digital signal processor (DSP), a network processor, or other device to execute code. Although only one processor(s) 50 is illustrated in FIG. 3, it should be understood that primary communication device 12 may include more than one processor in some embodiments. Memory element 52 may be configured to store software instructions and data associated with primary communication device 12. Memory element 52 may be any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in communication system 10 could be provided in any database, register, queue, table, cache, control list, or other storage structure, all of which can be referenced at any suitable timeframe. Any such storage options may also be included within the broad term 'memory element' as used herein.

Wireless transceiver 54 is configured to enable wireless communication with one or more of smart device 14 and network device 16. In particular embodiments, wireless transceiver 54 may include one or more of a Bluetooth transceiver, a Wi-Fi transceiver, a 3G and/or 4G transceiver, an NFC transceiver, ultrasound, or any other suitable wireless transceiver. In one or more embodiments, wireless transceiver 46 is configured to transmit notifications and receive loopback notifications from smart device 14.

OS module 18 includes software and/or hardware to facilitate use of an operating system layer to receive notifications from a notification source such as network device 16, and send the notifications to smart device 14 as described herein. Application module 20 includes software and/or hardware to facilitate receiving loopback notifications from smart device 14 as described herein. Application module 20 includes software and/or hardware, such as software applications, to facilitate processing of the received loopback notifications such as presenting the notification to a user of primary communication device 12.

Figure 4:
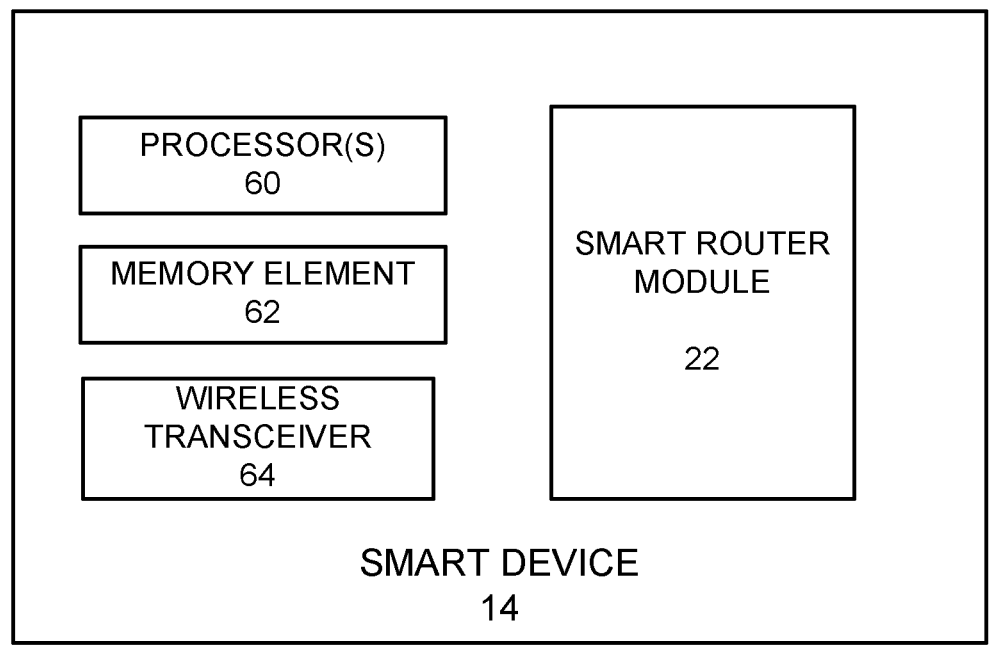
FIG. 4 illustrates an embodiment of a smart device of the communication system of FIG. 1.

FIG. 4 illustrates an embodiment of a smart device 14 of the communication system 10 of FIG. 1. In the particular embodiment illustrated in FIG. 4, smart device 14 includes one or more processor(s) 60, a memory element 62, a wireless transceiver 64, and smart router module 22. Processor(s) 60 is configured to execute software instructions to perform various operations of smart device 14 as described herein. Processor(s) 60 may be any type of processor, such as a micro-processor, an embedded processor, a digital signal processor (DSP), a network processor, or other device to execute code. Although only one processor(s) 60 is illustrated in FIG. 4, it should be understood that smart device 14 may include more than one processor in some embodiments. Memory element 62 may be configured to store software instructions and data associated with smart device 12. Memory element 62 may be any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in communication system 10 could be provided in any database, register, queue, table, cache, control list, or other storage structure, all of which can be referenced at any suitable timeframe. Any such storage options may also be included within the broad term 'memory element' as used herein.

Wireless transceiver 46 is configured to enable wireless communication with primary communication device 12. In particular embodiments, wireless transceiver may include one or more of a Bluetooth transceiver, a Wi-Fi transceiver, a 3G and/or 4G transceiver, an NFC transceiver, or any other suitable wireless transceiver. In one or more embodiments, wireless transceiver 64 is configured to loopback notifications to primary communication device 12.

Smart router module 22 includes software and/or hardware to facilitate the notification loopback operations of smart device 14 as described herein. In one or more embodiments, smart router module 22 is configured to receive notifications from primary communication device 12, determine whether each of the notifications meets predetermined criteria for loopback to primary communication device 12, and sending the notifications back to primary communication device 12 meeting the predetermined criteria.

Figure 5:
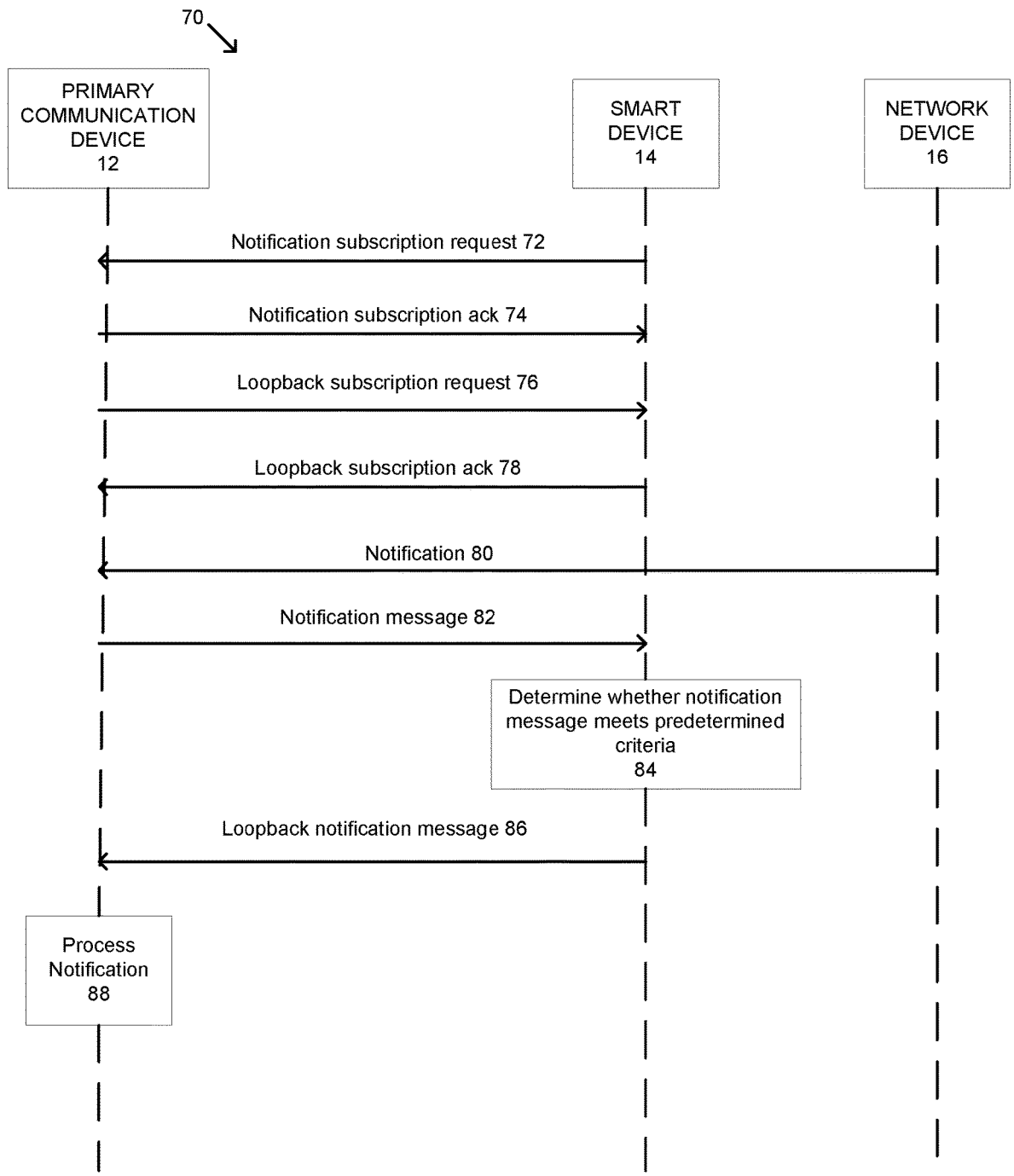
FIG. 5 illustrates a simplified flow diagram showing flows associated with the communication system of FIG. 1 in accordance with one embodiment.

FIG. 5 illustrates a simplified flow diagram 70 showing flows associated with the communication system of FIG. 1 in accordance with one embodiment. In 72, smart device 14 sends a notification subscription request to primary communication device 12 to smart device 14 to enable smart device 14 to receive notifications from an operating system (OS) layer of primary communication device 12. In 74, primary communication device 12 sends a notification subscription acknowledgement to smart device 14 indicating that the notification subscription request is acknowledged. In 76, primary communication device 12 sends a loopback subscription request to smart device 14 to enabled primary communication device 12 to receive looped back notifications from smart device 14.

In 80, network device 16 sends a notification including notification information to primary communication device 12. In 82, primary communication device 12 sends a notification message including the notification information to smart device 14 using a first communication protocol. In particular embodiments, the notification message is sent using ANCS. In one or more embodiments, the notification message further includes a notification category identifier indicative of a notification type of the notification.

In 84, smart device 14 determines whether the notification message meets predetermined criteria. In particular embodiments, the predetermined criteria may include such as a category of the notification indicated by the notification category identifier, user choice, a priority of the notification, and resource usage efficiency. In 86, if the notification message meets the predetermined criteria, smart device 14 sends a loopback notification message to primary communication device 12 including the notification information using a second communication protocol. In a particular embodiment, the loopback notification message is sent to primary communication device 12 using a BLE protocol.

In 88, one or more applications associated with primary communication device 12 process the notification information. In particular embodiments, processing the notification information may include displaying a visual representation of the notification information to a user associated with primary communication device 12 or producing an audio representation of the notification information for listening to by the user associated with primary communication device 12. In still other embodiments, the notification information may be sent to another device such as another smart device, a headset, an ear bud, a display, or other device configured to present the notification information to a user. Although the embodiment of FIG. 5 is illustrated using a single smart device in communication system 10, it should be understood that in other embodiments any number of smart devices may be present.

Figure 6:
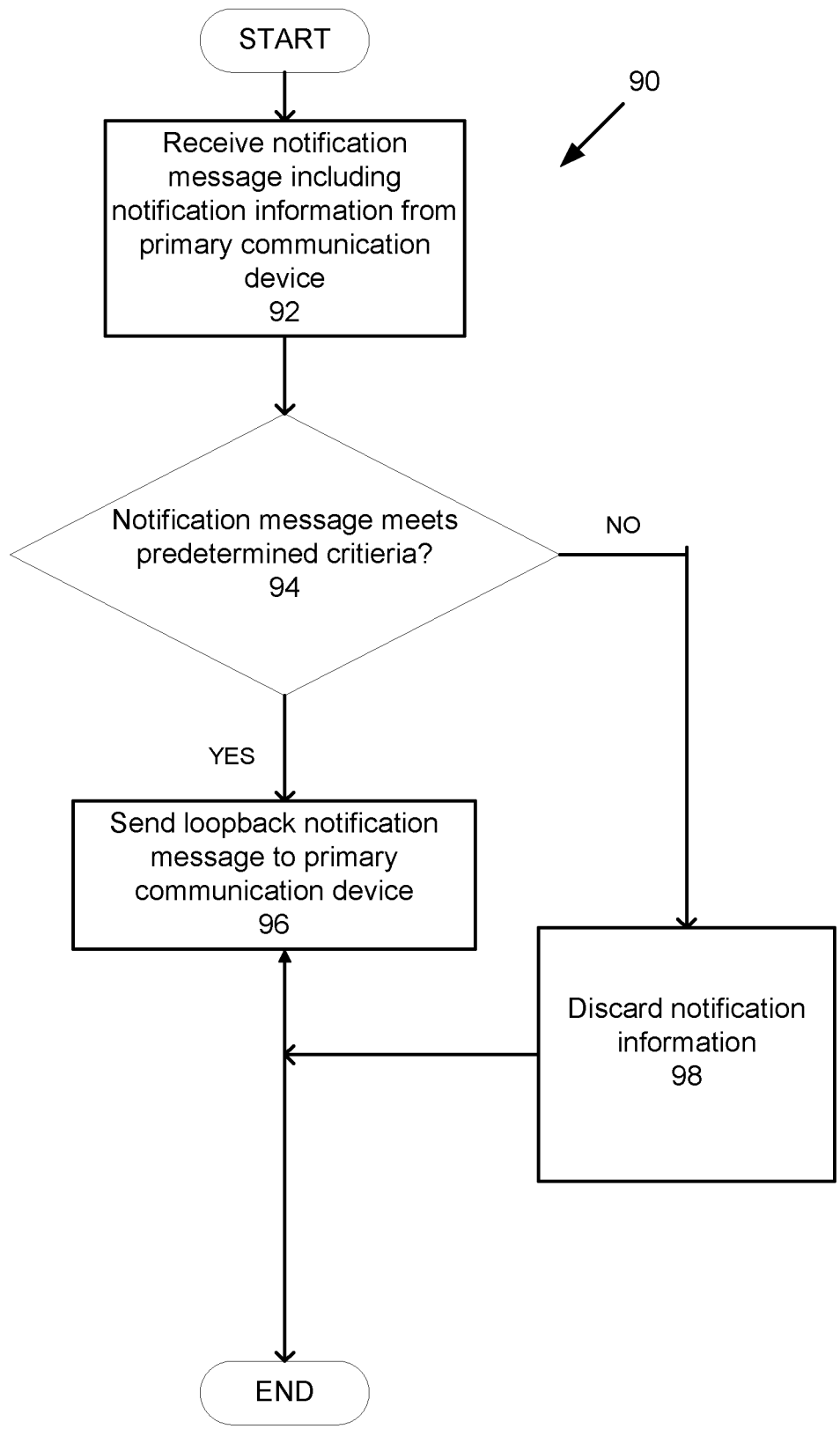
FIG. 6 illustrates a simplified flow chart showing operations associated with the smart device in accordance with one embodiment.

FIG. 6 illustrates a simplified flow chart 90 showing operations associated with smart device 14 in accordance with one embodiment. In 92, smart device 14 receives a notification message from primary communication device 12 using a first communication protocol. The notification message includes notification information received at an operating system layer of primary communication device 12. In 94, smart device 14 determines whether the notification message meets predetermined criteria. In 96, if smart device 14 determines that the notification message meets the predetermined criteria, smart device 14 sends a loopback notification message including a representation of at least a portion of the notification information to primary communication device 12 using a second communication protocol and the operations end. In 98, if smart device 14 determines that the notification message does not meet the predetermined criteria, smart device 14 discards the notification information and the operations end. In an alternative embodiment, if smart device 14 determines that the notification message does not meet the predetermined criteria, smart device 14 may queue the notification message until such time that the predetermined criteria is met.

In one or more embodiments, prior to receiving the notification message, smart device 14 may send a notification subscription request to primary communication device 12 indicative of a request to receive at least one notification message from the primary communication device, and receive a notification subscription acknowledgement from the primary communication device. In one or more embodiments, prior to receiving the notification message, smart device 14 may receive a loopback subscription request from the primary communication device indicative of a request to receive at least one loopback notification message from the smart device, and send a loopback subscription acknowledgement to the primary communication device.

In one or more embodiments, an application associated with the primary communication device is configured to process the representation of the at least a portion of the notification information. In more particular embodiments, processing the representation of the at least a portion of the notification information includes presenting the representation of the at least a portion of the notification information to a user associated with the primary communication device.

In one or more embodiments, the notification message includes a notification category identifier indicative of a category of the notification, and the predetermined criteria includes the notification category identifier. In particular embodiments, the notification message is received from a notification server 32 of primary communication device 12. In other particular embodiments, smart device 14 includes a notification client 36 for receiving notification message. In still other particular embodiments, smart device 14 includes a loopback server 38 for sending the loopback notification message to the primary communication device, and primary communication device 12 includes loopback client 34 for receiving the loopback notification message. In one or more embodiments, the first communication protocol includes an ANCS protocol. In still other embodiments, the second communication protocol includes a Bluetooth low-energy (BLE) protocol. In a particular embodiment, primary communication device 12 includes a smartphone. In still other particular embodiments, primary communications device 12 can include a tablet computer, a laptop computer, a desktop computer, a smart watch, or any other suitable communication device.

In regards to the internal structure associated with communication system 10, each of primary communication device 12, smart device 14, and network device 16 can include memory elements for storing information to be used in the operations outlined herein. Each of primary communication device 12, smart device 14, and network device 16 may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in communication system 10 could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, network elements of communication system 10, such as primary communication device 12, smart device 14, and network device 16, may include software modules to achieve, or to foster, operations as outlined herein. These modules may be suitably combined in any appropriate manner, which may be based on particular configuration and/or provisioning needs. In certain embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, each of primary communication device 12, smart device 14, and network device 16 may include a processor that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

One or more embodiments described herein may provide one or more advantages of overcoming existing limitations that prevent operating system layer notification data to be routed to an application by sending the notification data through an intermediary smart device.

Examples

The following examples pertain to further embodiments.

Example 1 is an apparatus, comprising logic, at least partially incorporated into hardware, to: receive a notification message from a primary communication device by a smart device using a first communication protocol, the notification message including notification information received at an operating system layer of the primary communication device; determine, by the smart device, whether the notification message meets predetermined criteria; and responsive to a determination that the notification message meets the predetermined criteria, send, by the smart device, a loopback notification message including a representation of at least a portion of the notification information to the primary communication device using a second communication protocol.

In Example 2, the subject matter of Example 1 can optionally include wherein the logic is further to: send a notification subscription request to the primary communication device indicative of a request to receive at least one notification message from the primary communication device; and receive a notification subscription acknowledgement from the primary communication device.

In Example 3, the subject matter of Example 1 can optionally include wherein the logic is further to: receive a loopback subscription request from the primary communication device indicative of a request to receive at least one loopback notification message from the smart device; and send a loopback subscription acknowledgement to the primary communication device.

In Example 4, the subject matter of Example 1 can optionally include wherein an application associated with the primary communication device is configured to process the representation of the at least a portion of the notification information.

In Example 5, the subject matter of Example 4 can optionally include wherein processing the representation of the at least a portion of the notification information includes presenting the representation of the at least a portion of the notification information to a user associated with the primary communication device.

In Example 6, the subject matter of Example 1 can optionally include wherein the notification message includes a notification category identifier indicative of a category of the notification.

In Example 7, the subject matter of Example 6 can optionally include wherein the predetermined criteria includes the notification category identifier.

In Example 8, the subject matter of Example 1 can optionally include wherein the notification message is received from a notification server of the primary communication device.

In Example 9, the subject matter of Example 1 can optionally include wherein the smart device includes a notification client for receiving notification message.

In Example 10, the subject matter of Example 1 can optionally include wherein the smart device includes a loopback server for sending the loopback notification message to the primary communication device.

In Example 11, the subject matter of Example 1 can optionally include wherein the primary communication device includes a loopback client for receiving the loopback notification message.

In Example 12, the subject matter of Example 1 can optionally include wherein the first communication protocol includes an Apple Notification Center Service (ANCS) protocol.

In Example 13, the subject matter of Example 1 can optionally include wherein the second communication protocol includes a Bluetooth low-energy protocol.

In Example 14, the subject matter of Example 1 can optionally include wherein the primary communication device includes one of a smartphone, a tablet computer, a laptop computer, a desktop computer, and a smart watch.

Example 15 is at least one non-transitory computer storage medium to store computer code comprising: computer code to receive a notification message from a primary communication device by a smart device using a first communication protocol, the notification message including notification information received at an operating system layer of the primary communication device; computer code to determine, by the smart device, whether the notification message meets predetermined criteria; and responsive to a determination that the notification message meets the predetermined criteria, computer code to send, by the smart device, a loopback notification message including a representation of at least a portion of the notification information to the primary communication device using a second communication protocol.

In Example 16, the subject matter of Example 15 can optionally include computer code to send a notification subscription request to the primary communication device indicative of a request to receive at least one notification message from the primary communication device; and computer code to receive a notification subscription acknowledgement from the primary communication device.

In Example 17, the subject matter of Example 15 can optionally include computer code to receive a loopback subscription request from the primary communication device indicative of a request to receive at least one loopback notification message from the smart device; and computer code to send a loopback subscription acknowledgement to the primary communication device.

In Example 18, the subject matter of Example 15 can optionally include wherein an application associated with the primary communication device is configured to process the representation of the at least a portion of the notification information.

In Example 19, the subject matter of Example 18 can optionally include wherein processing the representation of the at least a portion of the notification information includes presenting the representation of the at least a portion of the notification information to a user associated with the primary communication device.

In Example 20, the subject matter of Example 15 can optionally include wherein the notification message includes a notification category identifier indicative of a category of the notification.

In Example 21, the subject matter of Example 20 can optionally include wherein the predetermined criteria includes the notification category identifier.

Example 22 is a computer-implemented method comprising: receiving a notification message from a primary communication device by a smart device using a first communication protocol, the notification message including notification information received at an operating system layer of the primary communication device; determining, by the smart device, whether the notification message meets predetermined criteria; and responsive to a determination that the notification message meets the predetermined criteria, sending, by the smart device, a loopback notification message including a representation of at least a portion of the notification information to the primary communication device using a second communication protocol.

In Example 23, the subject matter of Example 22 can optionally include sending a notification subscription request to the primary communication device indicative of a request to receive at least one notification message from the primary communication device; and receiving a notification subscription acknowledgement from the primary communication device.

In Example 24, the subject matter of Example 22 can optionally include receiving a loopback subscription request from the primary communication device indicative of a request to receive at least one loopback notification message from the smart device; and sending a loopback subscription acknowledgement to the primary communication device.

In Example 25, the subject matter of Example 22 can optionally include wherein the notification message includes a notification category identifier indicative of a category of the notification.

In Example 26, the subject matter of Example 25 can optionally include wherein the predetermined criteria includes the notification category identifier.

Example 27 is an apparatus, comprising logic, at least partially incorporated into hardware, to: receive a notification message from a primary communication device by a smart device using a first communication protocol, the notification message including notification information received at an operating system layer of the primary communication device; determine, by the smart device, whether the notification message meets predetermined criteria; and responsive to a determination that the notification message meets the predetermined criteria, send, by the smart device, a loopback notification message including a representation of at least a portion of the notification information to the primary communication device using a second communication protocol.

In Example 28, the subject matter of Example 27 can optionally include wherein the logic is further to: send a notification subscription request to the primary communication device indicative of a request to receive at least one notification message from the primary communication device; and receive a notification subscription acknowledgement from the primary communication device.

In Example 29, the subject matter of Example 27 can optionally include wherein the logic is further to: receive a loopback subscription request from the primary communication device indicative of a request to receive at least one loopback notification message from the smart device; and send a loopback subscription acknowledgement to the primary communication device.

In Example 30, the subject matter of Examples 27-29 can optionally include wherein an application associated with the primary communication device is configured to process the representation of the at least a portion of the notification information.

In Example 31, the subject matter of Example 30 can optionally include wherein processing the representation of the at least a portion of the notification information includes presenting the representation of the at least a portion of the notification information to a user associated with the primary communication device.

In Example 32, the subject matter of Examples 27-29 can optionally include wherein the notification message includes a notification category identifier indicative of a category of the notification.

In Example 33, the subject matter of Example 32 can optionally include wherein the predetermined criteria includes the notification category identifier.

In Example 34, the subject matter of Examples 27-29 can optionally include wherein the notification message is received from a notification server of the primary communication device.

In Example 35, the subject matter of Examples 27-29 can optionally include wherein the smart device includes a notification client for receiving notification message.

In Example 36, the subject matter of Examples 27-29 can optionally include wherein the smart device includes a loopback server for sending the loopback notification message to the primary communication device.

In Example 37, the subject matter of Examples 27-29 can optionally include wherein the primary communication device includes a loopback client for receiving the loopback notification message.

In Example 38, the subject matter of Examples 27-29 can optionally include wherein the first communication protocol includes an Apple Notification Center Service (ANCS) protocol.

In Example 39, the subject matter of Examples 27-29 can optionally include wherein the second communication protocol includes a Bluetooth low-energy protocol.

In Example 40, the subject matter of Examples 27-29 can optionally include wherein the primary communication device includes one of a smartphone, a tablet computer, a laptop computer, a desktop computer, and a smart watch.

Example 41 is at least one non-transitory computer storage medium to store computer code comprising: computer code to receive a notification message from a primary communication device by a smart device using a first communication protocol, the notification message including notification information received at an operating system layer of the primary communication device; computer code to determine, by the smart device, whether the notification message meets predetermined criteria; and responsive to a determination that the notification message meets the predetermined criteria, computer code to send, by the smart device, a loopback notification message including a representation of at least a portion of the notification information to the primary communication device using a second communication protocol.

In Example 42, the subject matter of Example 41 can optionally include computer code to send a notification subscription request to the primary communication device indicative of a request to receive at least one notification message from the primary communication device; and computer code to receive a notification subscription acknowledgement from the primary communication device.

In Example 43, the subject matter of Example 41 can optionally include computer code to receive a loopback subscription request from the primary communication device indicative of a request to receive at least one loopback notification message from the smart device; and computer code to send a loopback subscription acknowledgement to the primary communication device.

In Example 44, the subject matter of Examples 41-43 can optionally include wherein an application associated with the primary communication device is configured to process the representation of the at least a portion of the notification information.

In Example 45, the subject matter of Example 44 can optionally include wherein processing the representation of the at least a portion of the notification information includes presenting the representation of the at least a portion of the notification information to a user associated with the primary communication device.

In Example 46, the subject matter of Examples 41-43 can optionally include wherein the notification message includes a notification category identifier indicative of a category of the notification.

In Example 47, the subject matter of Example 46 can optionally include wherein the predetermined criteria includes the notification category identifier.

Example 48 is a computer-implemented method comprising: receiving a notification message from a primary communication device by a smart device using a first communication protocol, the notification message including notification information received at an operating system layer of the primary communication device; determining, by the smart device, whether the notification message meets predetermined criteria; and responsive to a determination that the notification message meets the predetermined criteria, sending, by the smart device, a loopback notification message including a representation of at least a portion of the notification information to the primary communication device using a second communication protocol.

In Example 49, the subject matter of Example 48 can optionally include sending a notification subscription request to the primary communication device indicative of a request to receive at least one notification message from the primary communication device; and receiving a notification subscription acknowledgement from the primary communication device.

In Example 50, the subject matter of Example 48 can optionally include receiving a loopback subscription request from the primary communication device indicative of a request to receive at least one loopback notification message from the smart device; and sending a loopback subscription acknowledgement to the primary communication device.

In Example 51, the subject matter of Example 50 can optionally include wherein the notification message includes a notification category identifier indicative of a category of the notification.

Example 52 is an apparatus comprising: means for receiving a notification message from a primary communication device by a smart device using a first communication protocol, the notification message including notification information received at an operating system layer of the primary communication device; means for determining, by the smart device, whether the notification message meets predetermined criteria; and means for responsive to a determination that the notification message meets the predetermined criteria, sending, by the smart device, a loopback notification message including a representation of at least a portion of the notification information to the primary communication device using a second communication protocol.

In Example 53, the subject matter of Example 52 can optionally include means for sending a notification subscription request to the primary communication device indicative of a request to receive at least one notification message from the primary communication device; and means for receiving a notification subscription acknowledgement from the primary communication device.

In Example 54, the subject matter of Examples 52-53 can optionally include means for receiving a loopback subscription request from the primary communication device indicative of a request to receive at least one loopback notification message from the smart device; and means for sending a loopback subscription acknowledgement to the primary communication device.

In Example 55, the subject matter of Examples 52-53 can optionally include wherein an application associated with the primary communication device is configured to process the representation of the at least a portion of the notification information.

In Example 56, the subject matter of Example 55 can optionally include wherein processing the representation of the at least a portion of the notification information includes presenting the representation of the at least a portion of the notification information to a user associated with the primary communication device.

In Example 57, the subject matter of Example 1 can optionally include wherein the notification message includes a notification category identifier indicative of a category of the notification.

In Example 58, the subject matter of Example 57 can optionally include wherein the predetermined criteria includes the notification category identifier.

Example 59 is an apparatus comprising means for performing the method of any of the preceding claims.

In Example 60, the subject matter of Example 59 can optionally include wherein the means for performing the method comprise a processor and a memory.

In Example 61, the subject matter of Example 60 can optionally include wherein the memory comprises machine-readable instructions, that when executed cause the apparatus to perform the method of any of Examples 48-51.

In Example 62, the subject matter of Examples 59-62 can optionally include wherein the apparatus is a computing system.

Example 63 is at least one computer readable medium comprising instructions that, when executed, implement a method or realize an apparatus as found in any preceding Example.

What is claimed is:

1. An apparatus, comprising logic, at least partially incorporated into hardware, to:
   receive a notification message from a mobile device by a smart device using a first communication protocol, the notification message including notification information received at an operating system layer of the mobile device;
   determine, by the smart device, whether the notification message meets predetermined criteria; and
   responsive to a determination that the notification message meets the predetermined criteria, send, by the smart device, a loopback notification message including a representation of at least a portion of the notification information to the mobile device using a second communication protocol;
   wherein, the smart device is wearable and configured to be worn by a user.

2. The apparatus of claim 1, wherein the logic is further to:
   send a notification subscription request to the mobile device indicative of a request to receive at least one notification message from the mobile device; and
   receive a notification subscription acknowledgement from the mobile device.

3. The apparatus of claim 1, wherein the logic is further to:
   receive a loopback subscription request from the mobile device indicative of a request to receive at least one loopback notification message from the smart device; and
   send a loopback subscription acknowledgement to the mobile device.

4. The apparatus of claim 1, wherein an application associated with the mobile device is configured to process the representation of the at least a portion of the notification information;
   further wherein processing the representation of the at least a portion of the notification information includes presenting the representation of the at least a portion of the notification information to a user associated with the mobile device.

5. The apparatus of claim 1, wherein the notification message includes a notification category identifier indicative of a category of the notification.

6. The apparatus of claim 5, wherein the predetermined criteria include the notification category identifier.

7. The apparatus of claim 1, wherein the notification message is received from a notification server of the mobile device.

8. The apparatus of claim 1, wherein the smart device includes a notification client for receiving notification message.

9. The apparatus of claim 1, wherein the smart device includes a loopback server for sending the loopback notification message to the mobile device.

10. The apparatus of claim 1, wherein the mobile device includes a loopback client for receiving the loopback notification message.

11. The apparatus of claim 1, wherein the first communication protocol includes an Apple Notification Center Service (ANCS) protocol.

12. The apparatus of claim 1, wherein the second communication protocol includes a Bluetooth low-energy protocol.

13. The apparatus of claim 1, wherein the mobile device includes one of a smartphone, a tablet computer, a laptop computer, and a smart watch.

14. At least one non-transitory computer storage medium to store computer code comprising:
   computer code to receive a notification message from a mobile device by a smart device using a first communication protocol, the notification message including notification information received at an operating system layer of the mobile device;
   computer code to determine, by the smart device, whether the notification message meets predetermined criteria; and
   responsive to a determination that the notification message meets the predetermined criteria, computer code to send, by the smart device, a loopback notification message including a representation of at least a portion of the notification information to the mobile device using a second communication protocol;
   wherein, the smart device is wearable and configured to be worn by a user.

15. The at least one non-transitory computer storage medium of claim 14, further comprising:

computer code to send a notification subscription request to the mobile device indicative of a request to receive at least one notification message from the mobile device; and computer code to receive a notification subscription acknowledgement from the mobile device.

16. The at least one non-transitory computer storage medium of claim 14, further comprising:

computer code to receive a loopback subscription request from the mobile device indicative of a request to receive at least one loopback notification message from the smart device; and computer code to send a loopback subscription acknowledgement to the mobile device.

17. The at least one non-transitory computer storage medium of claim 14, wherein an application associated with the mobile device is configured to process the representation of the at least a portion of the notification information;

further wherein processing the representation of the at least a portion of the notification information includes presenting the representation of the at least a portion of the notification information to a user associated with the mobile device.

18. The at least one non-transitory computer storage medium of claim 14, wherein the notification message includes a notification category identifier indicative of a category of the notification.

19. The at least one non-transitory computer storage medium of claim 18, wherein the predetermined criteria include the notification category identifier.

20. A computer-implemented method comprising:

receiving a notification message from a mobile device by a smart device using a first communication protocol, the notification message including notification information received at an operating system layer of the mobile device;

determining, by the smart device, whether the notification message meets predetermined criteria; and responsive to a determination that the notification message meets the predetermined criteria, sending, by the smart device, a loopback notification message including a representation of at least a portion of the notification information to the mobile device using a second communication protocol;

wherein, the smart device is wearable and configured to be worn by a user.

21. The computer-implemented method of claim 20, further comprising:

sending a notification subscription request to the mobile device indicative of a request to receive at least one notification message from the mobile device; and receiving a notification subscription acknowledgement from the mobile device.

22. The computer-implemented method of claim 20, further comprising:

receiving a loopback subscription request from the mobile device indicative of a request to receive at least one loopback notification message from the smart device; and sending a loopback subscription acknowledgement to the mobile device.

23. The computer-implemented method of claim 20, wherein the notification message includes a notification category identifier indicative of a category of the notification.

24. The computer-implemented method of claim 23, wherein the predetermined criteria include the notification category identifier.

* * * * *